United States Patent [19]
Ushikubo et al.

[11] Patent Number: 5,403,174
[45] Date of Patent: Apr. 4, 1995

[54] PNEUMATIC RADIAL TIRES

[75] Inventors: Hisao Ushikubo; Tadashi Yamazaki, both of Tokyo, Japan

[73] Assignee: Bridgestone Corporation, Tokyo, Japan

[21] Appl. No.: 9,975

[22] Filed: Jan. 26, 1993

Related U.S. Application Data

[62] Division of Ser. No. 842,619, Feb. 27, 1992, Pat. No. 5,205,978.

[30] Foreign Application Priority Data

| Mar. 5, 1991 | [JP] | Japan | 3-78726 |
| Aug. 29, 1991 | [JP] | Japan | 3-242387 |

[51] Int. Cl.⁶ ............................................. B60C 3/04
[52] U.S. Cl. .................................... 425/43; 425/35; 425/52; 264/326
[58] Field of Search .............. 264/315, 326; 425/28.1, 425/32, 35, 43, 48, 52

[56] References Cited

U.S. PATENT DOCUMENTS

| 1,378,678 | 5/1921 | Hoffmann | 425/43 |
| 1,388,382 | 8/1921 | Schwartz | 425/35 |
| 1,642,541 | 9/1927 | Ellinwood | 425/52 |
| 1,841,408 | 1/1932 | Glynn | 425/35 |
| 2,451,992 | 10/1948 | Tegrotenhuis | 425/43 |
| 3,542,107 | 11/1970 | Mills | |
| 3,553,790 | 1/1971 | Brobeck et al. | 425/35 |
| 3,961,657 | 6/1976 | Chrobak | |
| 4,222,424 | 9/1980 | Tsuzura et al. | 264/326 |
| 4,776,781 | 10/1988 | Sakai | |

FOREIGN PATENT DOCUMENTS

| 0393965 | 10/1990 | European Pat. Off. |
| 0486274 | 5/1992 | European Pat. Off. |
| 2314059 | 1/1977 | France |
| 49-80702 | 8/1974 | Japan |
| 50-111701 | 9/1975 | Japan |
| 50-111702 | 9/1975 | Japan |
| 55-19685 | 2/1980 | Japan |
| 3-50001 | 3/1991 | Japan |
| 3-74209 | 3/1991 | Japan |
| 2009026 | 6/1979 | United Kingdom |
| 2070526 | 9/1981 | United Kingdom |

*Primary Examiner*—Charles S. Bushey
*Attorney, Agent, or Firm*—Sughrue, Mion, Zinn, Macpeak & Seas

[57] ABSTRACT

A pneumatic tire having improved high-speed running performances is manufactured by conducting vulcanization of a green tire with a mold provided at a position corresponding to a given position between neighborhood of shoulder portion and neighborhood of bead portion with at least one protrusion which protrudes inside the mold and continuously extends in the circumferential direction of the mold and consists of a first arc segment having a center of curvature located outside from the inner surface of the mold and second arc segments each having a center of curvature located inside from the inner surface of the mold and smoothly connecting to the first arc segment at upper and lower ends in the radial direction of the mold.

4 Claims, 3 Drawing Sheets

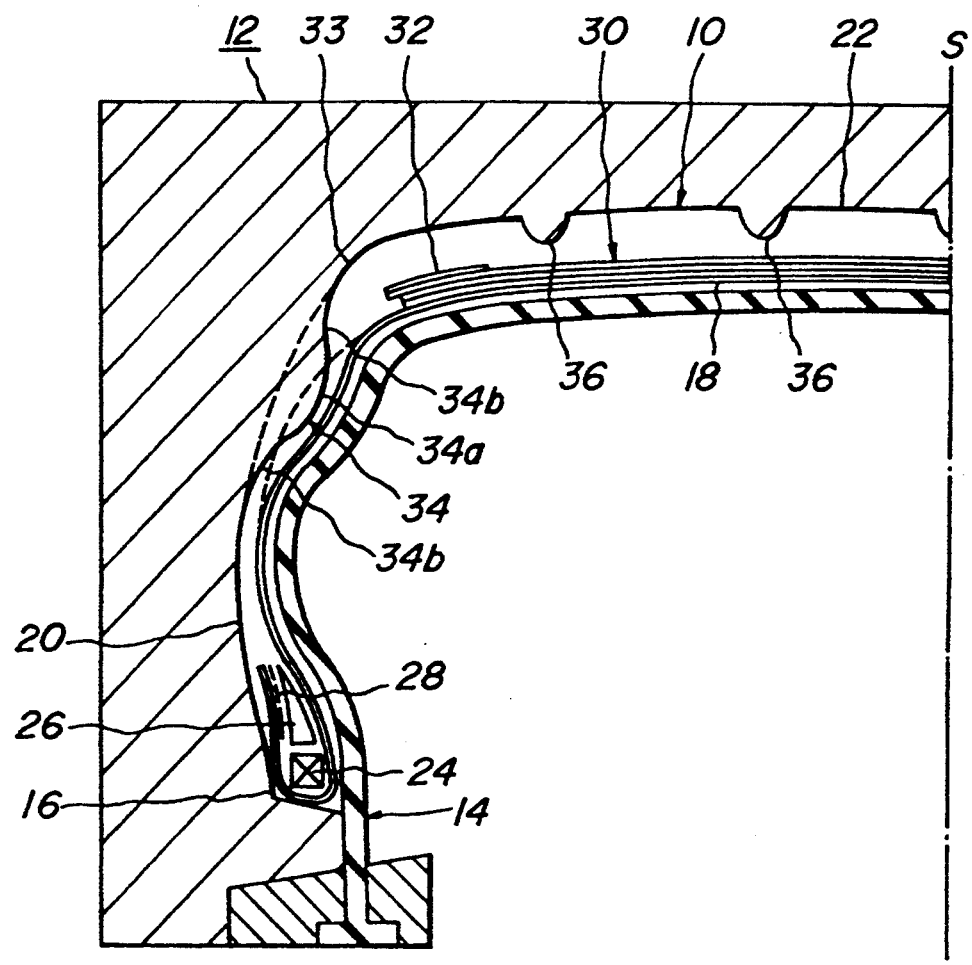
FIG_1

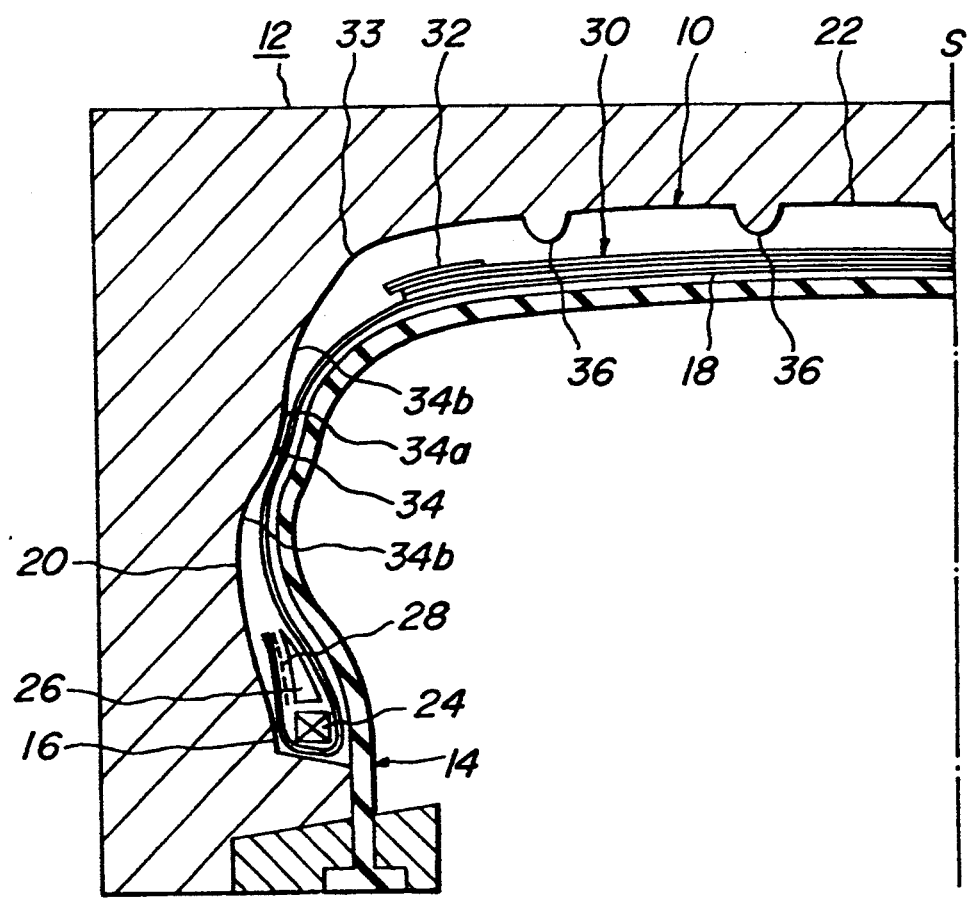
FIG_2

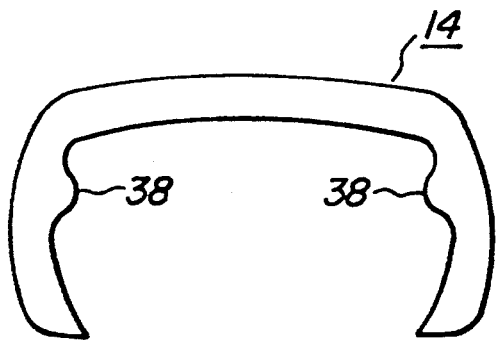
FIG_3a
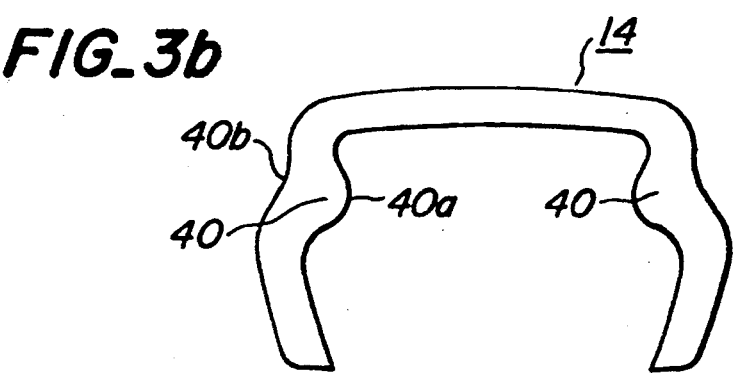
FIG_3b
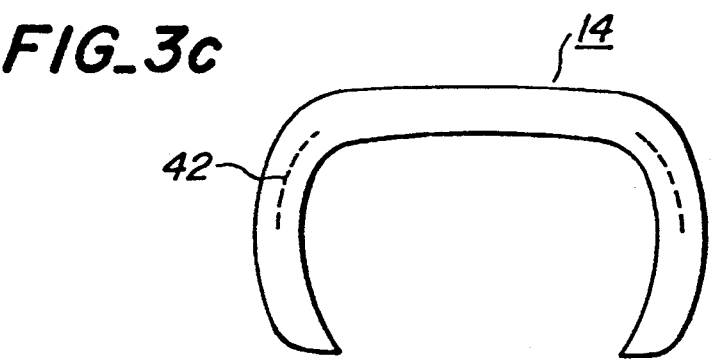
FIG_3c

PNEUMATIC RADIAL TIRES

This is a divisional of application Ser. No. 07/842,619, filed Feb. 27, 1992, now U.S. Pat. No. 5,205,978.

BACKGROUND OF THE INVENTION

1. Field of the Invention

This invention relates to pneumatic radial tires. More particularly it relates to a method of producing pneumatic radial tires which can advantageously improve high-speed running performances of the tire and a bladder used therefor.

2. Disclosure of the Related Art

A pneumatic radial tire comprises a carcass comprised of at least one cord ply of radial arrangement and a belt superimposed about a crown portion of the carcass and comprised of plural cord layers. This construction has many advantages in that the motion of tread rubber constituting the tread portion of the tire is reduced by a so-called "hoop" effect of the belt as compared with that of bias tires. Also, the durability, wear resistance and steering stability are excellent and the rolling resistance is low and the like. Therefore, these radial tires are favorably mounted onto many vehicles and used with recent enlargement of development of expressway networks.

On the other hand, the reinforcement is added to tread portion and bead portion of the pneumatic radial tire to cope with the high-speed running accompanied with recent improvement of vehicle performances, but it is strongly demanded to more improve the high-speed running performances of the tire in accordance with improvement of vehicle performances.

Therefore, there are proposed various techniques such as a change of end count and cord angle in the cords constituting the carcass or the belt, addition of a new reinforcing member and the like for controlling strain or heat generation at portions easily causing troubles or enhancing the rigidity of the tire casing.

In these proposed techniques, the rigidity of the tire casing as a whole is increased to create portions having undesirably increased rigidity, which is unfavorable in the running performances of tire and the ride comfortability. Also, there are caused inconveniences such as rise of cost, increase of weight and the like accompanied with the increase of the reinforcing members.

SUMMARY OF THE INVENTION

It is, therefore, an object of the invention to solve the aforementioned problems and to provide a novel method of producing pneumatic radial tires which can locally enhance the rigidity of only given portions of the tire casing to effectively improve the running performance of the tire without causing the rise of cost and increase of weight in the tire and the like as well as a bladder used therefor.

According to a first aspect of the invention, there is the provision of a method of producing pneumatic radial tires by vulcanization in a mold a green tire comprising a carcass comprised of at least one cord ply of radial arrangement toroidally extending between a pair of bead cores and turned at its side portions around the bead core from inside toward outside and a belt superimposed around a crown portion of the carcass and comprised of plural cord layers, characterized in that the vulcanization of the green tire is carried out in a mold provided at its inner surface portion corresponding to a given position between neighborhood of shoulder portion and neighborhood of bead portion in a tire to be manufactured with at least one protrusion which protrudes inside the mold and continuously extends in the circumferential direction of the mold and consists of a first arc segment having a center of curvature located outside from the inner surface of the mold and second arc segments each having a center of curvature located inside from the inner surface of the mold and smoothly connecting to the first arc segment at upper and lower ends in the radial direction of the mold, whereby a portion of the carcass is deviated inward from natural equilibrium profile at a position of the protrusion.

In a preferred embodiment of the first aspect, a bladder having a reduced expansion ratio at a position corresponding to the protrusion of the mold is internally touched with the green tire.

According to a second aspect of the invention, there is the provision of a bladder used for the vulcanization of a green tire together with a mold provided at its inner surface portion corresponding to a given position between neighborhood of shoulder portion and neighborhood of bead portion in a tire to be manufactured with at least one protrusion which protrudes inside the mold and continuously extends in the circumferential direction of the mold and consists of a first arc segment having a center of curvature located outside from the inner surface of the mold and second arc segments each having a center of curvature located inside from the inner surface of the mold and smoothly connecting to the first arc segment at upper and lower ends in the radial direction of the mold, characterized in that a pushing force of the bladder at a position corresponding to the protrusion of the mold is smaller than that of the remaining portion except for a bladder bead portion.

In a preferred embodiment of the second aspect, the expansion ratio of the bladder at the position corresponding to the protrusion of the mold is reduced by arranging a projection protruding inward from the bladder at this position, or by forming a thickened portion consisting of a projection protruding inward and an outer recess substantially similar to the protrusion of the mold in the bladder at the above position, or by embedding a reinforcing member in the bladder at the position.

BRIEF DESCRIPTION OF THE DRAWINGS

The invention will be described with reference to the accompanying drawings, wherein:

FIG. 1 is a partly sectional view of a first embodiment illustrating vulcanization of tire according to the invention;

FIG. 2 is a partly sectional view of a second embodiment illustrating vulcanization of tire according to the invention; and FIGS. 3a to 3c are schematically sectional views of various embodiments of the bladder according to the invention.

DESCRIPTION OF THE PREFERRED EMBODIMENTS

In the pneumatic radial tire manufactured according to the method of the invention, a tire portion including an inwardly deviated carcass portion expands significantly outward in the radial direction of the tire and hence the carcass bears a large tension over a region ranging from the inwardly deviated carcass portion toward portions adjacent thereto in the radial direction of the tire, e.g. a region ranging from maximum width portion of the tire toward shoulder portion under the selection of position in connection with the carcass deviated portion. Thus, the tire rigidity in the vicinity of the maximum width portion of the tire and the tire rigidity in the vicinity of the belt end portion are advantageously increased and also the movement of tread rubber at the belt end portion is effectively controlled.

According to the invention, therefore, the high-speed running performance of the tire can largely be improved without special addition and change of known tire constituting parts themselves.

The reason why the inwardly deviated carcass portion is formed between the neighborhood of the shoulder portion and the neighborhood of the bead portion is due to the fact that when the deviated portion is located in the tread portion over the neighborhood of the shoulder portion, the strain of tread rubber becomes larger due to the expansion of the deviated carcass portion outward from the tire and the separation failure of the belt is apt to be caused. However, when the deviated carcass portion is located near to the bead core in the bead portion, the deviated portion to approaches to a rim flange or is fixed by contacting therewith, so that even if the tire is inflated under an internal pressure, the tire can not be expanded outward to a desirable extent. Hence, the function inherent to the deviated carcass portion can not be developed.

Moreover, considering the actual effect produced by the arrangement of the deviated carcass portion, it is preferable that the deviated carcass portion is located between the neighborhood of the shoulder portion and the neighborhood of the tire maximum width position.

According to the production method of the invention, the pushing force in such a portion of the bladder that corresponds to the position of the protrusion formed in the mold is made smaller than that of the other portion under the inflation of internal pressure. Thus, the force of pushing the green tire to the mold is somewhat weakened at the portion having the reduced expansion ratio to prevent the excessive flowing of outer coating rubber in the tire at a position corresponding to the protrusion of the mold and consequently a fear of air leakage due to outer exposure of carcass cords can be sufficiently removed.

In other words, when the tire portion corresponding to the protrusion of the mold is pushed by a bladder portion having the expansion ratio equal to that of the other portion, the pushing force of this tire portion toward the protrusion of the mold tends to be locally increased, so that a greater part of the outer coating rubber flows toward the portions adjacent to the protrusion of the mold and finally the carcass cords are exposed and hence it is obliged to cause air leakage from the exposed carcass portion at a relatively premature stage.

In this case, the lowering of the pushing force in the portion of the bladder corresponding to the protrusion of the mold can easily and surely be attained by arranging a projection protruding inward from the bladder at this position, or by forming a thickened portion comprising of a projection protruding inward and an outer recess substantially similar to the protrusion of the mold in the bladder at the above position, or by embedding a reinforcing member in the bladder at the position.

In FIG. 1 is sectionally shown a mold in its widthwise direction when a green tire 10 is vulcanized in a mold 12 according to the method of the invention.

Moreover, the tire to be manufactured has substantially a symmetrical structure with respect to an equatorial plane S, so that only one half of the tire is shown for convenience' sake.

The green tire 10 has a skeleton structure reinforcing a sidewall portion 20 and a tread portion 22 with a carcass 18 comprised of at least one carcass cord ply of radial arrangement toroidally extending between a pair of bead portion 16 separated away from each other in the rotating axial direction of the tire. In the carcass 18, at least one carcass cord ply is wound around a bead core 24 in each of the bead portions 16 from inside toward outside to form a turnup portion.

In the green tire 10 of this embodiment, the carcass 18 comprises one carcass cord ply. Moreover, the ply number may be increased in accordance with the specification of tire to be manufactured. In the latter case, at least one carcass cord ply is wound around the bead core 24 in the same manner as described above.

A bead filler 26 and a reinforcing layer 28 are disposed between the carcass 18 and its turnup portion to reinforce a region ranging from the bead portion 16 to the sidewall portion. In this case, the number and arranging position of the reinforcing layers are not limited to the illustrated embodiment and may properly be changed, if necessary.

Further, a belt 30 comprised of plural cord layers is superimposed about an outer periphery of a crown portion of the carcass 18 in the tread portion 22 constituting a ground contacting surface of the tire. Each side end portion of the belt 30 in the widthwise direction is reinforced with an auxiliary layer 32 in circumferential direction as in the known high-speed running radial tires.

On the other hand, the mold 12 is provided at its inner surface portion corresponding to a given position between neighborhood of the shoulder portion 33 and neighborhood of bead portion 16 of the tire to be manufactured with a protrusion 34 continuously extending in the circumferential direction of the mold and protruding inward from the inner surface of the mold. As shown in FIG. 1, the profile of the protrusion 34 is specified into a convex shape inward the mold 12 in a section of the mold 12 in its widthwise direction by a first arc segment 34a having a center of curvature located outside from the inner surface of the mold 12 and secondly by two arc segments 34b each having a center of curvature located inside from the inner surface of the mold 12 and smoothly connecting to the first arc segment 34a at upper and lower ends in the radial direction of the mold.

Moreover, the shape of the protrusion 34 is selected so that when the tire vulcanized with the use of the mold 12 is mounted onto a normal rim and inflated under a given internal pressure, an outer profile length P of a recess portion formed in the side surface of the tire by the protrusion 34 is 4%–25%, preferably 10%–20% of an outer tire profile length L.

The term "outer tire profile length L" used herein means a curved length measured from the equator S of the tire to a bead base along the outer profile of the tire in the radial section of the tire. Moreover, when grooves are formed in the tread portion, the above tire profile passes a line segment connecting to surfaces of adjoining island portions separated by the groove. The term "outer profile length of recess portion P" used herein means a curved length measured along the outer profile of the tire from a contact point to the other contact point of a straight line circumscribedly drawn between portions adjacent to both sides of the recess portion in the radial direction of the tire, i.e. between peaks of the second two arc segments 34b sandwiching the first arc segment 34a.

When vulcanization of the green tire 10 with the mold 12 occurs, the green tire is first placed in the mold provided at its inner surface with the protrusion 34 and then the mold is closed, while the bladder 14 is expanded by supplying a pressurized fluid into the inside of the bladder 14 disposed inside the green tire, whereby the green tire is forced toward the inner surface of the mold, during which the heating is carried out. Thus, a vulcanized radial tire is obtained in which a portion of the green tire corresponding to the protrusion 34 and hence a portion of the carcass corresponding to the protrusion 34 is deviated inward in the tire.

Moreover, numeral 36 is a protrusion for forming a groove in the tread portion of the tire to be manufactured, and dotted lines show an outer profile of a tire and a carcass line thereof when the green tire is vulcanized by using the conventionally known mold.

When the thus vulcanized tire is inflated under a given internal pressure, the carcass portion deviated inward in the tire is expanded toward the outside of the tire to increase tension bearing on the carcass portions sandwiching the deviated carcass portion, i.e. carcass portions located at the tire shoulder portion and the tire maximum width portion as previously mentioned, so that the rigidity of these carcass portions and hence the rigidities of belt end portion and sidewall portion in the tire can sufficiently be enhanced. Consequently, the running performance of the tire inclusive of the steering stability can effectively be improved without changing the known tire constituting parts.

Moreover, when the protrusion 34 formed in the inner surface of the mold 12 is located near the bead portion of the tire to be manufactured as shown in FIG. 2, the tension bearing of the carcass portion near to the bead portion 16 can be increased to effectively enhance the rigidity of the sidewall portion.

As previously mentioned, the reason why the protrusion 34 is formed in the mold at a position between neighborhood of the shoulder portion and neighborhood of the bead portion in the tire to be manufactured is due to the fact that when the deviated portion 18 of the carcass is located in the tread portion over the shoulder portion, the tension bearing of the deviated portion and the carcass portions adjacent thereto is increased as compared with those of the other carcass portions to increase strain of tread rubber at the belt end portion and hence the separation failure is apt to be caused to lower the belt durability. When the protrusion 34 is located close to the bead core, the function inherent to the deviated carcass portion can not be developed as mentioned above.

In the preferred embodiment of the invention, when the vulcanized tire is mounted onto a normal rim and inflated under a given internal pressure, the outer profile length P of the recess portion formed in the side surface of the tire is selected to satisfy a range of 4%–25% of the outer tire profile length L.

That is, when the outer profile length P is less than 4% of the outer tire profile length L, the ratio of P to L is too small and hence it is difficult to expect the increase of tension bearing of the carcass portion corresponding to a given position between neighborhood of the shoulder portion and neighborhood of the bead portion in the tire when being inflated under the internal pressure. When the ratio exceeds 25%, tire tends to expand outward as a whole, so that tension acting to the carcass is dispersed over the whole of the tire and it is difficult to expect the local increase of tension bearing in the given carcass portion.

As seen from the above, the recess portion formed in the side surface of the tire according to the invention is essentially different from a so-called decoration slightly recessed in the outer surface of the sidewall portion near to the tread end side.

A tire having a tire size of 255/40ZR17 was manufactured according to the method of the invention and its high-speed running performance was compared with those of a comparative tire mentioned later.

In this test tire, the carcass comprised two carcass cord plies of radial arrangement containing nylon-6,6 cords of 1260d/2 arranged at an angle of approximately 80° with respect to the equator of the tire, the cords of which plies being crossed with each other. One of the two plies located inside the tire was wound around a bead core from inside toward outside, while the other ply located outside the tire was wound around the bead core from outside toward inside.

A reinforcing layer 28 was arranged between the turnup portion of the inner carcass ply and a bead filler 26 disposed about the bead core 24 and between the above turnup portion and the outer carcass ply, respectively. Each of these reinforcing layers contained aromatic polyamide fiber cords of 1500d/2 arranged at a cord angle of approximately 30° with respect to a line segment in the circumferential direction of the tire and had a maximum height of 43 mm as measured from bead base.

A belt 30 comprised of two cord layers containing aromatic polyamide fiber cords of 1500d/2 was arranged at a cord angle of approximately 35° with respect to the equator of the tire, the cords of which layers being crossed with each other. An auxiliary layer 32 was constructed by spirally winding nylon-6,6 cord of 1260d/2 in the circumferential direction of the tire to cover each side end portion of the belt 30 over a width corresponding to 30% of the belt width.

Invention Tire I

This tire is a tire shown in FIG. 1, which is manufactured by using a mold provided with a protrusion 34 continuously extending in the circumferential direction of the tire at a position corresponding to a side surface of the tire to be manufactured. A recess portion formed by the protrusion 34 is located at such a position that a height of the bottom of the recess portion measured from the bead base is approximately 77% of a tire section height (=102 mm) when the vulcanized tire is mounted onto a normal rim (9×17) and inflated under a given internal pressure (2.5 kg/cm$^2$), and has such a size that the outer profile length P is approximately 10.3% of the outer tire profile length L (=210 mm).

Although the carcass 18 is comprised of single cord ply of the radial arrangement in FIG. 1, the actual test tire comprises the carcass 18 comprised of two carcass cord plies as mentioned above.

Invention Tire II

This tire is a tire shown in FIG. 2, which has the same structure as in the invention tire I except that the bottom of the recess portion formed in the side surface of the tire by the protrusion 34 is located at a height corresponding to approximately 68.6% of the tire section height (=102 mm) as measured from the bead base and the outer profile length P of the recess portion is approximately 9.5% of the outer tire profile length L (=210 mm).

Comparative Tire

This tire has the same structure as in the above invention tire except that a portion corresponding to the recess portion of the invention tire is not formed in the side surface of the vulcanized tire.

Test Method

A vehicle provided with the test tires was run on a circuit course of 6 km, during which lap time was measured and straight running performance and cornering performance were evaluated by feeling test. The results are shown in Table 1 by index value based on the comparative tire as a control.

Moreover, the larger the index value, the better the result.

TABLE 1

|  | Invention tire I | Invention tire II | Comparative tire |
|---|---|---|---|
| Lap time | 105 | 103 | 100 |
| Straight running performance | 102 | 105 | 100 |
| Cornering performance | 107 | 105 | 100 |

As seen from Table 1, when the tires manufactured by the method of the invention are compared with the comparative tire, the lap time, straight running performance and cornering performance during the high-speed running are effectively improved to obtain excellent high-speed running performance.

Thus, according to the method of the invention, pneumatic tires having advantageously improved high-speed running performances can be provided by sufficiently enhancing the rigidity only at given positions of the tire without enhancing the rigidity of the tire as a whole.

Although the method of the invention has been described with reference to FIGS. 1 and 2, when the pushing force of the bladder 14 internally touching with the green tire 10 and pushing it toward the inner surface of the mold 12 at a position corresponding to the protrusion 34 of the mold in the inflation of internal pressure is made smaller than that of the other portions of the bladder except for the bladder bead portion in the vulcanization of the green tire according to the invention, the force of pushing the tire 10 can properly be lowered at the portion having a reduced expansion ratio. Thus, the excessive flowing of outer coating rubber due to large force of pushing the green tire 10 toward the protrusion 34 of the mold can effectively be prevented to substantially completely prevent the exposure of the carcass 18 to the outside of the tire.

FIGS. 3a to 3c are schematically sectional views of various embodiments of the bladder capable of use together with the mold 12 having the protrusion 34 in the vulcanization of the green tire.

The bladder 14 shown in FIG. 3a is provided at a position corresponding to the protrusion 34 of the mold with a projection 38 protruding inward from the bladder. The expansion ratio in the inflation of internal pressure is reduced by the projection 38. In the bladder 14 shown in FIG. 3b, the pushing force in the inflation of internal pressure is reduced by a thickened portion 40 having a thickness thicker than the other portions and consisting of a projection 40a protruding inward and an outer recess 40b substantially similar to the protrusion 34 of the mold. In the bladder 14 shown in FIG. 3c, the pushing force is reduced by embedding a reinforcing member 42 such as fiber cords or the like in the bladder at the position corresponding to the protrusion 34 of the mold.

In order to compare the performance of these bladders, tires having the same structure as in the invention tire I except that the height of the bottom of the recess portion in the tire to be manufactured as measured from the bead base was approximately 68.6% of the tire section height (=102 mm) were manufactured by using the above bladders, and then the thickness of the outer coating rubber at the bottom of the recess portion in the tire (thickness of rubber located outside the carcass) was measured to obtain results as shown in Table 2.

Moreover, the target thickness was 2.0 mm.

TABLE 2

|  | Bladder of FIG. 3a | Bladder of FIG. 3b | Bladder of FIG. 3c | Conventional bladder having uniform expanding ratio over a whole |
|---|---|---|---|---|
| Thickness of outer coating rubber | 1.5 (mm) | 2.0 (mm) | 1.8 (mm) | 0.2 (mm) |
| Appearance | OK (Thickness is somewhat thin, but there is caused no problem) | OK (no problem) | OK (no problem) | Carcass cords were visually observed. |

As seen from Table 2, all of the bladders according to the invention can provide sufficient thickness in the outer coating rubber as compared with the conventional bladder, so that the leakage of internal pressure can completely be prevented.

As mentioned above, according to the method of the invention, only the rigidity of given portion in the tire is locally enhanced without unnecessarily enhancing the rigidity of the tire casing as a whole. As a result, high-speed running performance of the tire can largely be improved without causing the rise of cost and increase of weight in the tire.

Furthermore, when the vulcanization of the tire is carried out by using the bladder according to the invention, the excessive flowing of outer coating rubber can sufficiently be prevented to effectively remove a fear of causing the leakage of internal pressure.

What is claimed is:

1. A bladder and mold used for the vulcanization of a green tire comprising; said mold provided at its inner surface portion corresponding to a given position between neighborhood of shoulder portion and neighborhood of bead portion in a tire to be manufactured at least one protrusion which protrudes inwardly and continuously extends in the circumferential direction of the mold; said protrusion comprising a first arc segment having a center of curvature located outside from the inner surface of the mold and second arc segments each having a center of curvature located inside from the inner surface of the mold and smoothly connecting to the first arc segment at upper and lower ends in the radial direction of the mold, said bladder comprising means for generating a pushing force of the bladder at a position corresponding to the protrusion of the mold that is smaller than a pushing force of the remaining portion of said bladder except for a bladder bead portion.

2. The bladder and mold according to claim 1, wherein said means for generating a pushing force at the position corresponding to the protrusion of the mold that is reduced comprises a projection protruding inward from the bladder at such position.

3. The bladder and mold according to claim 1, wherein said means for generating a pushing force at the position corresponding to the protrusion of the mold that is reduced comprises a thickened portion consisting of a projection protruding inward and an outer recess substantially similar to the protrusion of the mold in the bladder at such position.

4. The bladder and mold according to claim 1, wherein said means for generating a pushing force at the position corresponding to the protrusion of the mold that is reduced comprises a reinforcing member embedded in the bladder at such position.

* * * * *